C. B. MERRIAM.
FASTENER.
APPLICATION FILED JAN. 18, 1919.

1,337,938.

Patented Apr. 20, 1920.

Witness
Karl H. Butler
Chas. W. Stauffiger

Inventor
Cyrus B. Merriam,
By
Attorneys

UNITED STATES PATENT OFFICE.

CYRUS B. MERRIAM, OF DETROIT, MICHIGAN.

FASTENER.

1,337,938.      Specification of Letters Patent.      Patented Apr. 20, 1920.

Application filed January 18, 1919. Serial No. 271,784.

*To all whom it may concern:*

Be it known that I, CYRUS B. MERRIAM, a citizen of the United States of America, residing at Detroit, in the county of Wayne and State of Michigan, have invented certain new and useful Improvements in Fasteners, of which the following is a specification, reference being had therein to the accompanying drawings.

The primary object of my invention is to provide a simple, durable and inexpensive fastener that may be advantageously used as automobile hardware for holding the overlapped edges of side curtains, panels, or other members adapted to coöperate with an automobile top in providing an inclosure for an automobile body.

Another object of my invention is to provide a fastener embodying a stud and a rotatable member, said rotatable member being constructed so that in one position it may be readily removed from the stud and in an adjusted position positively retained thereon against accidental displacement. The rotatable member is associated with a holding member and has a limited movement relative thereto, so that said rotatable member may be shifted to two positions, one defining a locked condition of the rotatable member and the other position an unlocked position of said member.

A further object of my invention is to provide a fastener wherein the parts are constructed with a view to being easily assembled, presents no obstructions on which the goods may be torn, and on a small scale be applicable as a glove fastener or means for holding two pieces of cloth together without danger of either being torn due to the fastening means.

The above and other objects are obtained by a mechanical construction that will be hereinafter specifically described and then claimed, and reference will now be had to the drawings, wherein Figure 1 is a front elevation of the fastener in a closed position;

Figure 1:
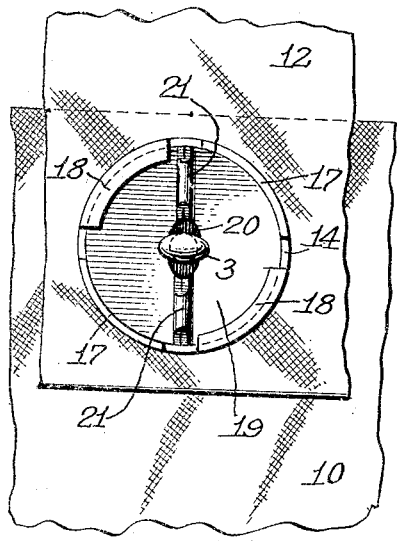
Figures 2, 3:
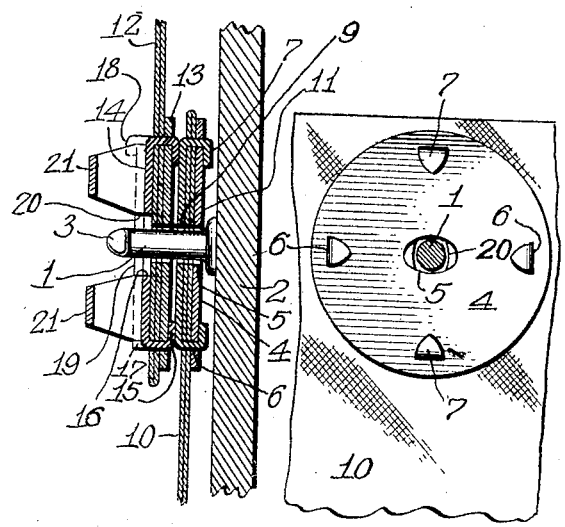
Fig. 2 is a vertical sectional view of the same.
Fig. 3 is a rear elevation of the fastener.
Figure 4:
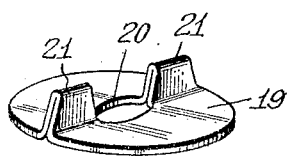
Fig. 4 is a perspective view of the detached rotatable member.
Figure 5:
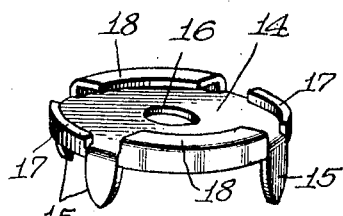
Fig. 5 is a perspective view of a detached holding member.
Figure 7:
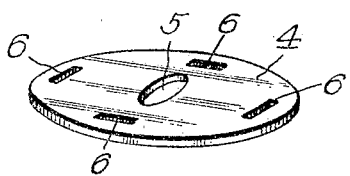
Fig. 7 is a similar view of a detached back member.
Figure 6:
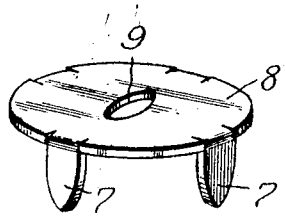
Fig. 6 is a similar view of a detached securing member.

First considering the fastener as designed for automobile hardware, the reference numeral 1 denotes a long stud or bolt suitably connected to an automobile body 2 or other support, said stud or bolt at the outer end thereof being provided with a cross head 3, which is preferably in the form of an oval or oblong button. 4 denotes a circular back plate provided with a central oval hole or oblong opening 5 providing clearance for the head 3 of the stud 1 when said back plate is placed on the stud. Adjacent the marginal or peripheral edges of the back plate 4 are slots 6 adapted to receive the prongs 7 of a circular securing plate 8, said prongs being integral with said plate and said plate having a central opening 9 corresponding to the opening 5. The members 4 and 8 are adapted to be placed together with a piece of material 10 therebetween and with the prongs 7 extending through the material 10 and the slots 6, said prongs can be bent inwardly or clenched on the back plate or member 4, as best shown in Fig. 2, thereby firmly holding the piece of material relative to the members 4 and 8. The piece of material 10 is provided with an opening 11 similar to the openings 5 and 9, thereby providing clearance to the stud 1 and permitting of the piece of material 10 being held relative to said stud. The piece of material 10 may represent the edge of a curtain, panel or other member to be held relative to the automobile body or support 2, and said piece of material may have its edge of two ply or otherwise reinforced.

12 denotes another piece of material, similar to the piece of material 10 and this piece of material is sandwiched between a back plate or member 13 and a holding member 14, said back plate or member 13 being similar to the back plate or member 4 and the holding member 14 somewhat similar to the securing plate or member 8, insomuch that said holding member has prongs 15 adapted to extend through the material 12 and be clenched against the back member 13. Of course, the piece of material 12 and members 13 and 14 have openings 16 providing clearance for the stud 1.

The holding member 14, besides being formed with integral prongs 15, is formed with outstanding flanges 17 and inwardly projecting overhanging retaining flanges 18. The prongs 15 are preferably four in number with the outstanding flanges 17 diametrically opposed and also the retaining flanges 18. These last mentioned flanges are adapted to overhang and retain a rotatable member 19 on the holding member 14, said rotatable member being cut and stamped from sheet metal so that when pressed to form it will be circular in plan with an oval opening 20 and diametrically opposed finger pieces 21, said finger pieces being formed by two plies of the material from which the rotatable member is made. The finger pieces 21 project outwardly and extend from the opening 20 to the marginal edges of said member, and in so doing are adapted to impinge against the ends of the retaining flanges 18 when the member 19 is rotated. The ends of the flanges 18 will therefore serve as stops for the rotatable member and define two positions of said member relative to the holding member. One position is that of the opening 20 registering with the opening 16 so as to provide clearance for the head 3 of the stud 1 and permit of the fastener elements being removed from said stud. The other position is that of the opening 20 being at a right angle to the opening 16, thus locking the rotatable member behind the head 3 of the stud so that the fastener elements will be held on said stud.

The outstanding flanges 17 may not be necessary but I provide the same so as to more or less protect the edges of the rotatable member 19, when said member is being shifted.

From the foregoing, it will be observed that the holder 14 and parts associated therewith may be used in connection with a stud carried by any member, but as shown in Fig. 2 it has been especially designed for connecting the overlapped edges of curtains to an automobile body. The parts of the fastener can be made of sheet metal pressed to form and finished to harmonize with the automobile curtains or other automobile trimmings or hardware.

One embodiment of my invention has been illustrated, but it is to be understood that the structural elements are susceptible to such variations and modifications as fall within the scope of the appended claim.

What I claim is:—

In a fastener, the combination of a stud having a head, a back member, a holding member connected to said back member adapted to retain material therebetween, overhanging stop flanges carried by said holding member, a rotatable member on said holding member and retained thereon by said flanges, and finger pieces pressed out from said rotatable member and adapted to engage said stop flanges and define the position of said rotatable member relative to said holding member, said rotatable member having an opening shaped to receive said stud and permit of its marginal edges engaging behind the head of said stud when said rotatable member is adjusted for such purpose.

In testimony whereof I affix my signature in the presence of two witnesses.

CYRUS B. MERRIAM.

Witnesses:
 ANNA M. DORR,
 LEWIS E. FLANDERS.